United States Patent
Toman et al.

(10) Patent No.: US 6,357,562 B1
(45) Date of Patent: Mar. 19, 2002

(54) AERODYNAMIC WHEEL-BEARING HOUSING

(75) Inventors: Vilem Toman, Wiernsheim; Michael Preiss, Vaihingen; Bernhard Jost, Friolzheim; Thomas Wiegand, Stuttgart, all of (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/659,064

(22) Filed: Sep. 11, 2000

(30) Foreign Application Priority Data

Sep. 11, 1999 (DE) .......................................... 199 43 536

(51) Int. Cl.[7] ............................................. F16D 65/78
(52) U.S. Cl. ............................... 188/264 AA; 188/71.6; 301/6.3
(58) Field of Search ...................... 301/6.3; 188/464 A, 188/264 AA, 264 R, 71.6

(56) References Cited

U.S. PATENT DOCUMENTS

| | | | |
|---|---|---|---|
| 4,232,763 A | * 11/1980 | Klaue | 188/264 AA |
| 4,473,139 A | * 9/1984 | Oka et al. | 188/71.6 |
| 4,503,944 A | * 3/1985 | Burckhardt et al. | 188/71.6 |
| 4,805,747 A | * 2/1989 | Moedinger et al. | 188/264 A |
| 4,901,826 A | * 2/1990 | Preiss | 188/264 A |
| 4,979,597 A | * 12/1990 | Mehlitz | 188/264 AA |
| 5,002,160 A | * 3/1991 | Weiler et al. | 188/71.6 |
| 5,727,895 A | * 3/1998 | Busse et al. | 188/264 AA |

FOREIGN PATENT DOCUMENTS

| | | |
|---|---|---|
| DE | 2830450 C3 | 7/1978 |
| DE | 3803801 A1 | 2/1988 |
| JP | 55115635 | * 5/1980 ................ 188/71.6 |
| JP | 57000929 | * 6/1982 ................ 188/71.6 |

* cited by examiner

*Primary Examiner*—Christopher P. Schwartz
*Assistant Examiner*—Devon Kramer
(74) *Attorney, Agent, or Firm*—Crowell & Moring LLP

(57) ABSTRACT

A wheel bearing housing for suspending a wheel of a vehicle is provided. The wheel, mounted at the wheel bearing housing, is provided with a brake device. In order to create a wheel suspension device which has devices for guiding air that are provided at low construction costs, it is provided that the outside of the wheel bearing housing is formed at least regionally as an air-guiding element.

17 Claims, 6 Drawing Sheets

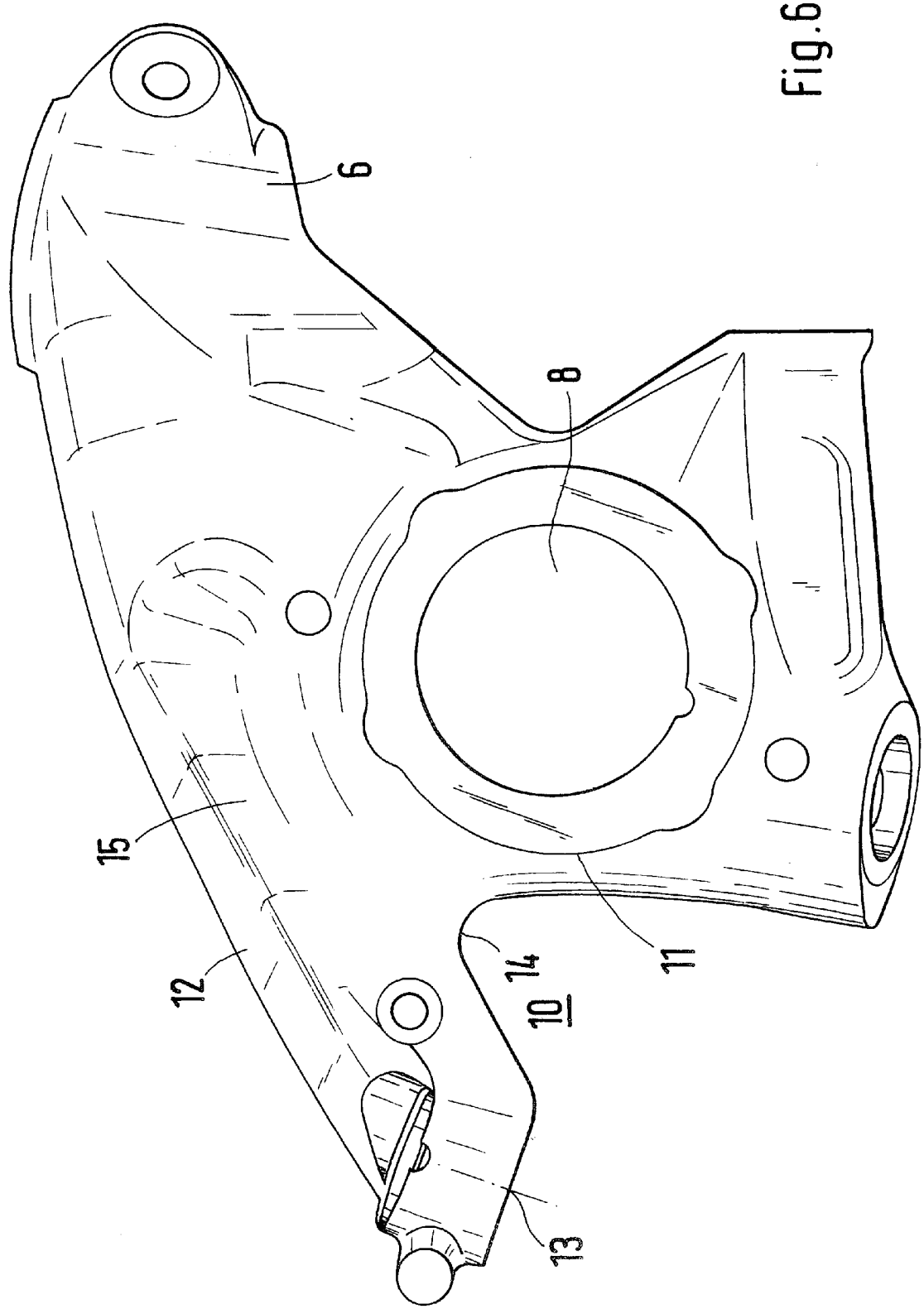

AERODYNAMIC WHEEL-BEARING HOUSING

BACKGROUND AND SUMMARY OF THE INVENTION

This application claims the priority of German patent document 199 43 536.7, filed Sep. 11, 1999, the disclosure of which is expressly incorporated by reference herein.

The invention relates to a wheel bearing housing for suspending a wheel of a vehicle which is provided with a wheel brake.

In general, the function of wheel bearing housings of vehicles is to connect a wheel with a vehicle body and to guide the wheel. In the case of driven wheels, bearings are provided in addition for a drive shaft.

From the German patent document DE 28 30 450 C3, a radius link for the wheel of a vehicle has become known, for which the radius link is constructed hollow. The cavity of the link is provided with two openings. The first opening is disposed closed to a braking device, which is radially within the wheel. A second opening is aligned in the driving direction, so that the air stream is directed through the hollow wheel radius link onto the brake. If this arrangement is to be used in conjunction with a wishbone, a blade-shaped deflection surface should be provided at the inlet opening, in order to steer the air stream in the direction of the inlet opening. The cost of manufacturing the cavity is a disadvantage of this known solution.

Therefore, starting out from this state of the art, it is an object of the invention to provide a wheel suspension device, which has facilities for guiding air and can be constructed less expensively.

Pursuant to the invention, this objective is accomplished with a wheel bearing housing for guiding a wheel of a vehicle, the wheel, mounted at the wheel bearing housing, being provided with a brake device, wherein an outside of the housing is constructed at least regionally as an air-guiding element.

It is proposed according to preferred embodiments of the invention that the outside of a wheel bearing housing be constructed at least regionally as an air-guiding element. The invention is based on the knowledge that it is sufficient to guide an entering air stream through air-guiding elements in the direction of a braking device. Compared to known solutions, the invention has the advantage that a continuous, closed duct does not have to be provided in the wheel suspension element, in this case a wheel bearing housing, and that the production of an external formation is significantly simpler.

Advantageous further developments of preferred embodiments of the invention are described below and in the claims. For example, it is proposed that the air-guiding element be constructed as an open duct. Such a construction can be produced clearly more easily than a closed duct guide and has essentially the same effect.

Furthermore, it is proposed that attachments, which are provided at the wheel bearing housing for connecting with a vehicle body, be used regionally to form a wall of the air-guiding element. By this measure, the cross section and guiding length of the air-guiding element can be enlarged further. In this connection, it is proposed concretely that the attachments be constructed curved and configured so that, at their point of attachment, they lead away from the wheel, that is, that they usually lie in a direction at right angles to the driving direction.

Other objects, advantages and novel features of the present invention will become apparent from the following detailed description of the invention when considered in conjunction with the accompanying drawings.

BRIEF DESCRIPTION OF THE DRAWINGS

FIG. 6 shows the wheel bearing housing of FIG. 4, however without add-on parts.

DETAILED DESCRIPTION OF THE DRAWINGS

Figure 1:
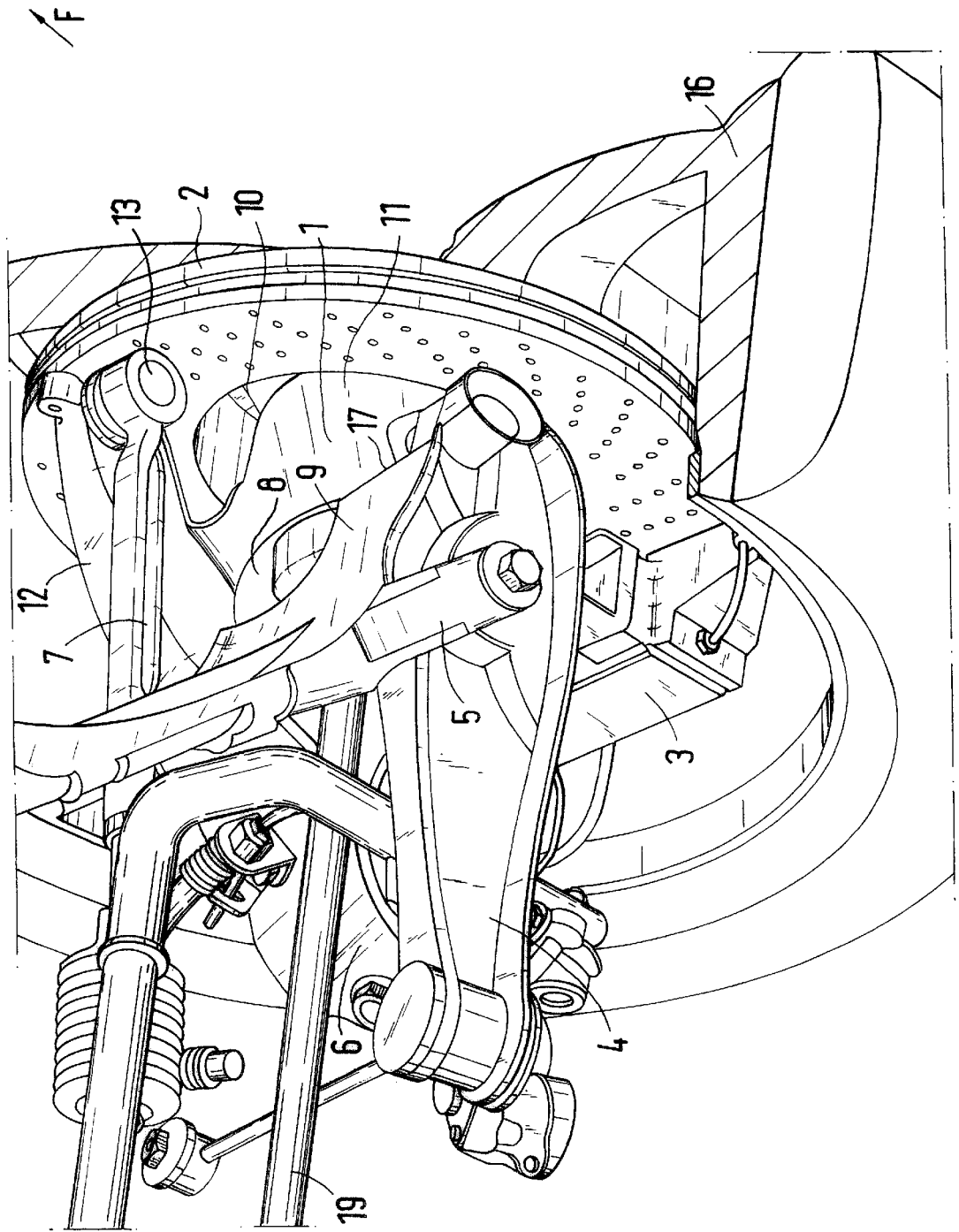
FIG. 1 is a perspective overview of a wheel bearing housing in the installed state, constructed according to a preferred embodiment of the invention.
Figure 2:
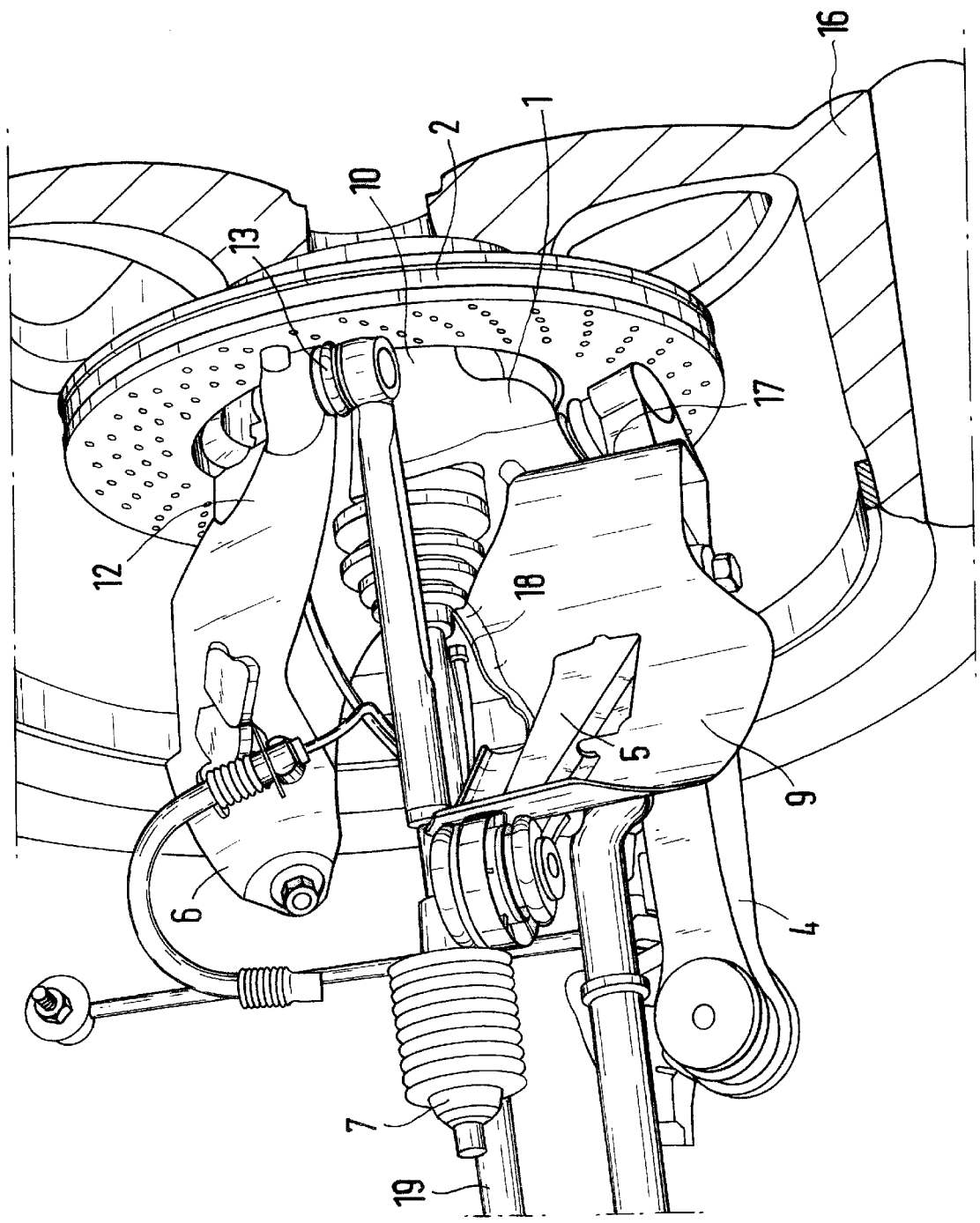
FIG. 2 shows the representation of FIG. 1, however from a different angle.

The wheel bearing housing 1, shown in FIGS. 1 and 2, is disposed at a front axle of a motor vehicle. Within a wheel 16, an internally ventilated brake disk 2 is disposed as a braking device and interacts with a caliper 3, which is fastened to the wheel bearing housing. The wheel bearing housing 1 is pivotably connected over a wishbone 4, a trailing arm 5 and a seat 6 for a suspension strut with a vehicle body that is not shown. The tilted position of the wheel bearing housing 1 in relation to the vehicle body is adjusted with a tie rod 7. A drive shaft 19 is held in a central opening 8 of the wheel bearing housing and drives the wheel 16.

A guide vane 9, the front end of which extends approximately in the driving direction F and the rear end 17 of which points in the direction of the brake disk 2, is held at the trailing arm 5. Such a guide vane is known already, for example, from the German patent document DE 38 03 801 A1.

The wheel bearing housing 1 is constructed as air-guiding element in a region pointing in the driving direction F. No further attachments are provided for this purpose at the wheel bearing housing 1 in a surface region adjoining a region 10 at a basic cylindrical housing 11. With this, the circular region 10, through which air can pass to the inside of the brake disk 2 and reach the inlet openings of the internal ventilation of the brake disk 2, which are located there, arises between an inner edge of the brake to disk 2 and the basic cylindrical housing 11. The guide vane 9 is disposed here so that it directs the air, flowing in from the driving direction F, into the region 10. The basic cylindrical element 11 therefore, as an elongation of the guide vane 9, acts as an air-guiding element.

In addition, an attachment 12, which is provided at the wheel bearing housing 1 for attachment to the tie rod 7, is shaped so that it extends at its connecting point 15 at the wheel bearing housing 1 (see FIG. 5) initially transversely to the driving direction F, that is, away from the wheel 16, and then leads in an arc 14 to a coupling point 13 for the tie rod 7. The inside of the attachment 12, formed by the arc 14, constitutes a continuation of the air-guiding element, formed by the basic cylindrical housing 11, and a boundary for the region 10.

In FIG. 1, the wheel bearing housing 1 is shown from the inside and below. On the other hand, in FIG. 2, the wheel bearing housing 1 is shown essentially from the inside and the front.

Figure 3:
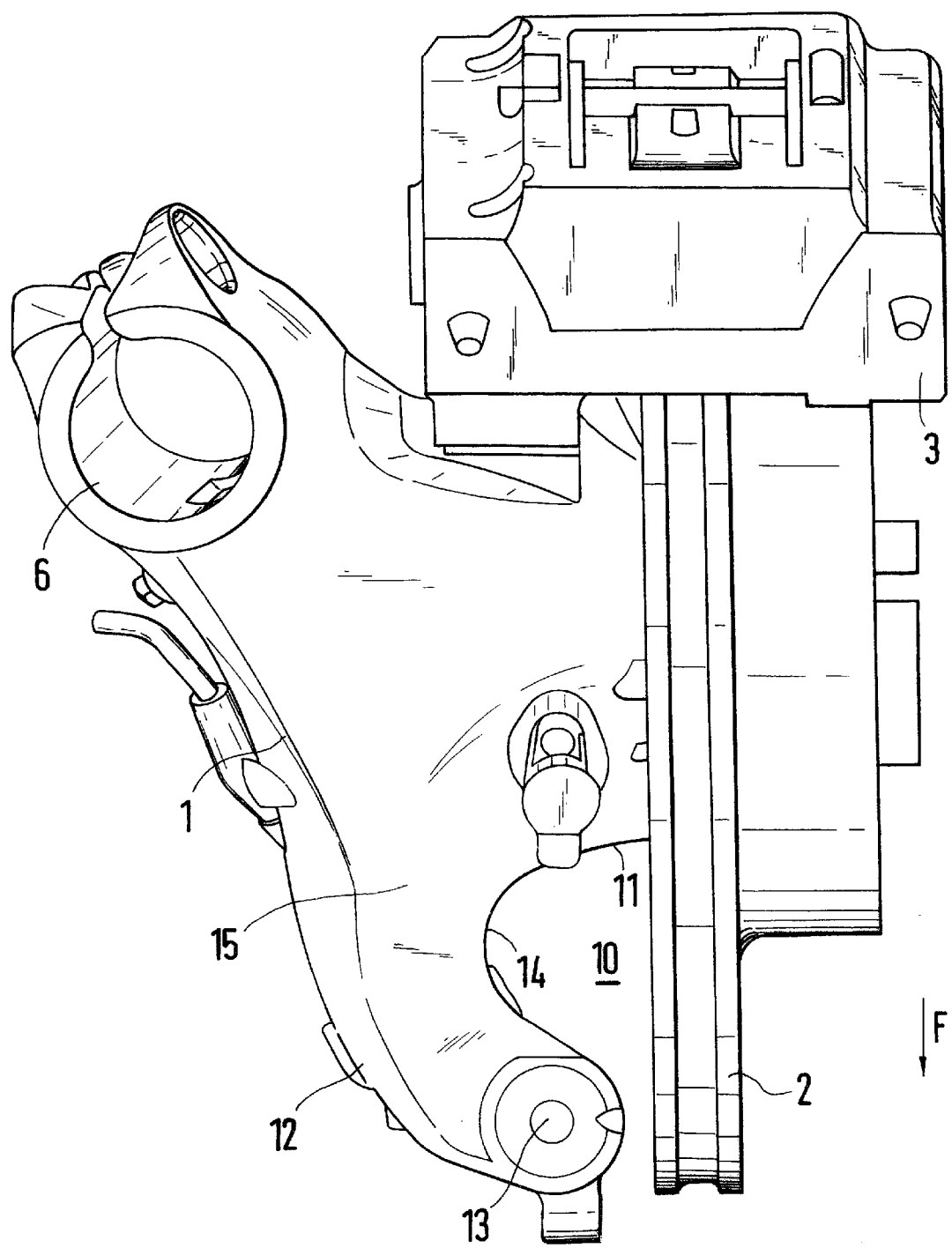
FIG. 3 shows a plan view of the wheel bearing housing in the installed state.

FIG. 3 shows a plan view of the wheel bearing housing 1 together with the brake disk 2 and the caliper 3. The region 10, which is bounded on the one side by the brake disk 2 and on the other side by the curvature 14 of the attachment 12, can be recognized clearly here.

Figure 4:
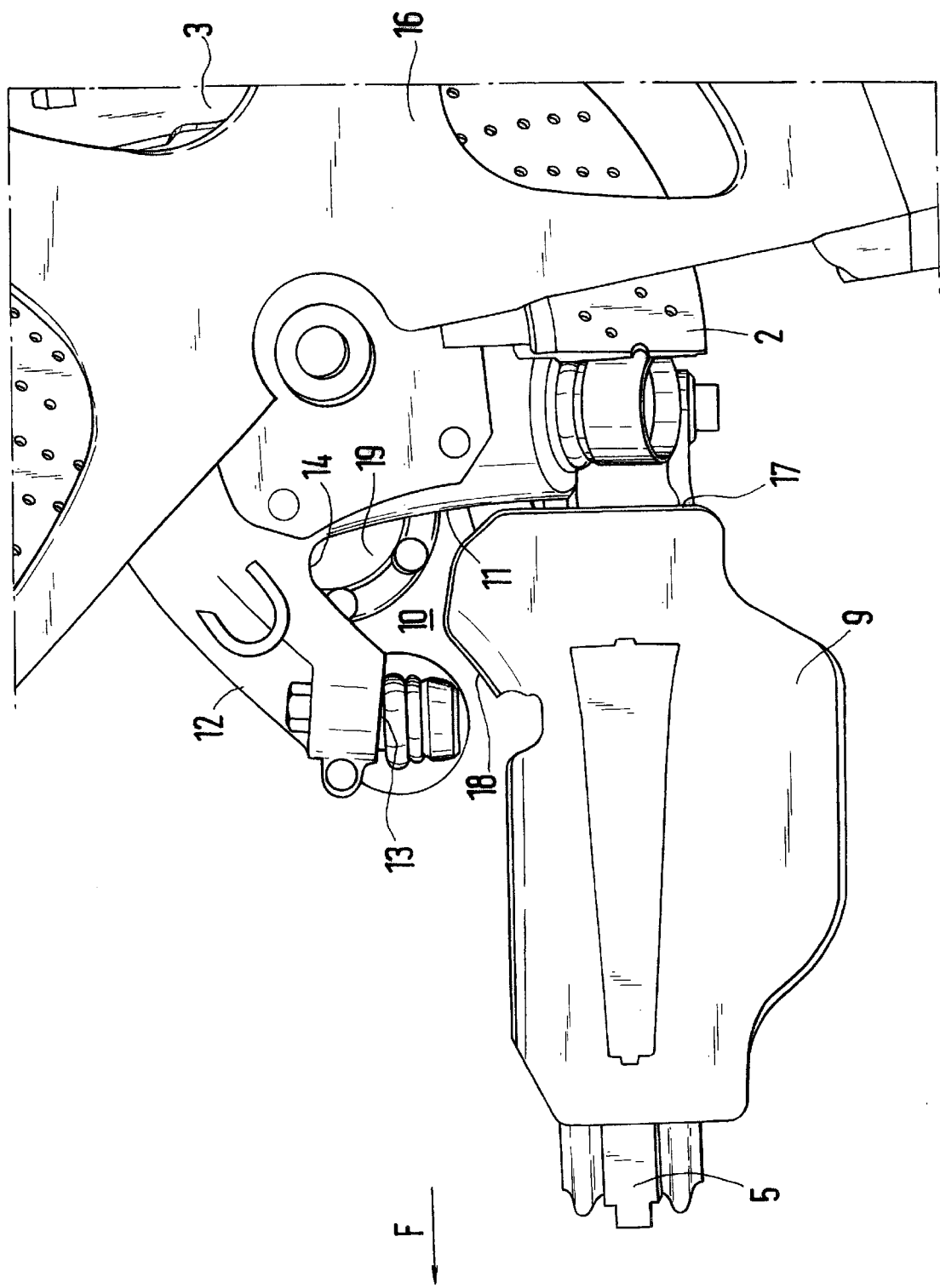
FIG. 4 shows a side view of the wheel bearing housing in the installed state, opened up in places.

FIG. 4 shows a side view of the wheel bearing housing 1 in the installed state. For greater clarity, a wheel 16, as well as the brake disk 2 were cut open in the region facing the driving direction F. It can be seen clearly that the rear edge 17 of the guide vane 9 faces the basic cylindrical housing 11 directly. Moreover, a guiding element 18, disposed at the upper side of the guide to vane 9, is aligned so that a portion of the air stream, coming from the guide vane 9, is passed into the curvature 14. In coordination between the guide vane 9 and the outside of the wheel bearing housing 1, here the region 10 formed by the basic housing 11 and the attachment 12, air flows over the whole cross-section of region 10. This contributes further to the improvement of the supply of air to the brake disk since now the inner sides of the air ducts are supplied over a larger angle of rotation and, with that, for a longer time with fresh cooling air.

Figure 5:
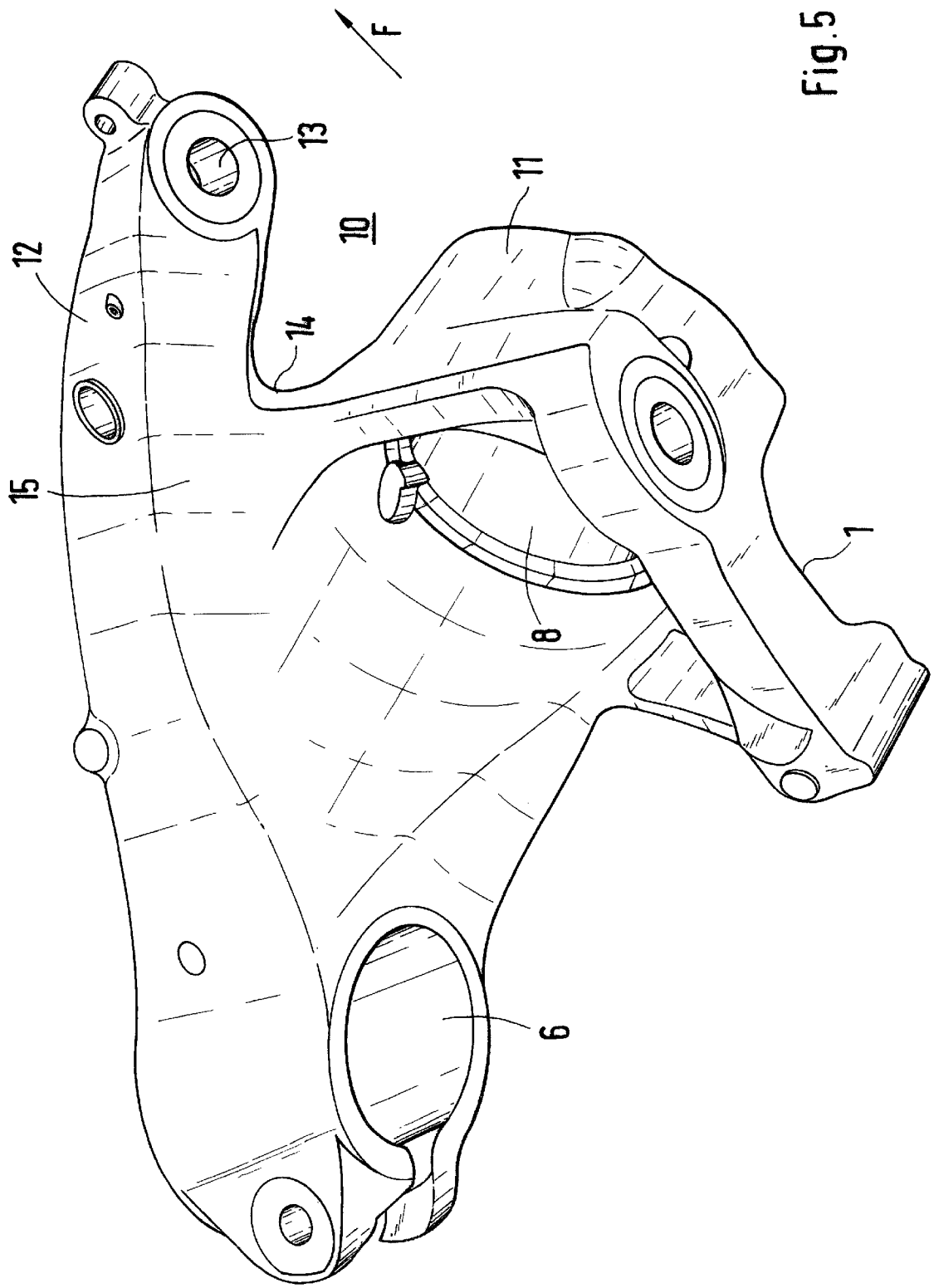
FIG. 5 shows the wheel bearing housing of FIG. 1, however without add-on parts.

In FIG. 5, the bearing housing 1 is shown once again by itself. The region 10, which forms an open duct that extends from the basic housing 11 to the curvature 14 of the attachment 12, can be seen clearly. FIG. 6 shows the wheel bearing housing by itself in the side view of FIG. 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel bearing housing for guiding a wheel of a vehicle, the wheel, mounted at the wheel bearing housing, being provided with a brake device,
wherein an outside of the wheel bearing housing is constructed at least regionally as an air-guiding element thereby facilitating guiding of air to the brake device without formation of a closed air guiding duct.

2. The wheel bearing housing of claim 1, wherein the air-guiding element is an open duct.

3. The wheel bearing housing of claim 1, wherein attachments, which are used regionally for forming a wall of the air-guiding element, are provided at the housing for connection with a vehicle body.

4. The wheel bearing housing of claim 2, wherein attachments, which are used regionally for forming a wall of the air-guiding element, are provided at the housing for connection with a vehicle body.

5. The wheel bearing housing of claim 3, wherein the attachments have a curved shape and, at their point of attachment are configured so as to lead away from the wheel.

6. The wheel bearing housing of claim 4, wherein the attachments have a curved shape and, at their point of attachment are configured so as to lead away from the wheel.

7. The wheel bearing housing of claim 5, wherein a guide vane, which guides a stream of air in the direction of the air-guiding element at the wheel bearing housing, is disposed at a trailing arm of a vehicle wheel suspension assembly.

8. The wheel bearing housing of claim 6, wherein a guide vane, which guides a stream of air in the direction of the air-guiding element at the wheel bearing housing, is disposed at a trailing arm of a vehicle wheel suspension assembly.

9. A vehicle wheel assembly comprising:
a vehicle wheel,
a vehicle wheel brake device,
a wheel bearing for the vehicle wheel, and
a wheel bearing housing for the wheel bearing,
wherein said wheel bearing housing includes air guiding outer surface sections operable to guide air to brake elements of the brake device thereby facilitating guiding of air to the brake elements without formation of a closed air guiding duct.

10. An assembly according to claim 9, wherein the air guiding outer surface sections form an open duct.

11. A wheel bearing housing for guiding a wheel of a vehicle, the wheel, mounted at the wheel bearing housing, being provided with a brake device,
wherein an outside of the housing is constructed at least regionally as an air-guiding element, and
wherein attachments, which are used regionally for forming a wall of the air-guiding element, are provided at the housing for connection with a vehicle body.

12. The wheel bearing housing of claim 11, wherein the air-guiding element is an open duct.

13. The wheel bearing housing of claim 11, wherein the attachments have a curved shape and, at their point of attachment are configured so as to lead away from the wheel.

14. The wheel bearing housing of claim 12, wherein the attachments have a curved shape and, at their point of attachment are configured so as to lead away from the wheel.

15. The wheel bearing housing of claim 13, wherein a guide vane, which guides a stream of air in the direction of the air-guiding element at the wheel bearing housing, is disposed at a trailing arm of a vehicle wheel suspension assembly.

16. The wheel bearing housing of claim 14, wherein a guide vane, which guides a stream of air in the direction of the air-guiding element at the wheel bearing housing, is disposed at a trailing arm of a vehicle wheel suspension assembly.

17. The wheel bearing housing of claim 11, wherein a guide vane, which guides a stream of air in the direction of the air-guiding element at the wheel bearing housing, is disposed at a trailing arm of a vehicle wheel suspension assembly.

* * * * *